US008182669B2

(12) United States Patent
Mezic et al.

(10) Patent No.: US 8,182,669 B2

(45) Date of Patent: May 22, 2012

(54) DYNAMIC EQUILIBRIUM SEPARATION, CONCENTRATION, AND MIXING APPARATUS AND METHODS

(75) Inventors: Igor Mezic, Goleta, CA (US); Frederic Bottausci, Santa Barbara, CA (US); Idan Tuval, Cambridge (GB)

(73) Assignee: The Regents of the University of California, Oakland, CA (US)

( * ) Notice: Subject to any disclaimer, the term of this patent is extended or adjusted under 35 U.S.C. 154(b) by 1496 days.

(21) Appl. No.: 11/561,248

(22) Filed: Nov. 17, 2006

(65) Prior Publication Data

US 2007/0175755 A1 Aug. 2, 2007

Related U.S. Application Data

(60) Provisional application No. 60/737,989, filed on Nov. 18, 2005.

(51) Int. Cl.
*G01N 27/447* (2006.01)

(52) U.S. Cl. ........................................ 204/547; 204/643

(58) Field of Classification Search .................. 204/547, 204/643

See application file for complete search history.

(56) References Cited

FOREIGN PATENT DOCUMENTS

WO WO 01/05514 * 1/2001

OTHER PUBLICATIONS

Hughes, "AC electrokinetics: applications for nanotechnology," Nanotechnology 11 (2000) 124-132.

Muller et al., "Trapping of micrometre and sub-micrometre particles by high-frequency electric fields and hydrodynamic forces," J. Phys. D: Appl. Phys. 29 (1996) 340-349.

Chang et al., "Closed-form solutions in the electrical field analysis for dielectrophoretic and travelling wave inter-digitated electrode arrays," J. Phys. D: Appl. Phys. 36 (2003) 3073-3078.

Ramos et al., "AC electrokinetics: a review of forces in microelectrode structures," J. Phys. D: Appl. Phys. 31 (1998) 2338-2353.

Castellanos et al., "Electrohydrodynamics and dielectrophoresis in microsystems: scaling laws," J. Phys. D: Appl. Phys. 36 (2003) 2584-2597.

Green et al., "AC Electrokinetics: a survey of sub-micrometre particle dynamics," J. Phys. D: Appl. Phys. 33 (2000) 632-641.

Green et al., "Electrothermally induced fluid flow on microelectrodes," J. of Elec.:, 53 ( 2) (2001) 71-87.

Green et al., "Separation of submicrometre particles using a combination of dielectrophoretic and electrohydrodynamic forces," J. Phys. D: Appl. Phys. 31 (7) (Apr. 7, 1998) L25-L30.

Green et al., "Fluid flow induced by nonuniform ac electric fields in electrolytes on microelectrodes. I. Experimental measurements," Phys. Rev. E: 61 (4) (2000) 4011-4018.

Green et al., "Fluid flow induced by nonuniform ac electric fields in electrolytes on microelectrodes. III. Observation of streamlines and numerical simulation," Phys. Rev. E: 66 (2) (2002) 026305-1-026305-11.

(Continued)

*Primary Examiner* — Alex Noguerola
*Assistant Examiner* — Gurpreet Kaur
(74) *Attorney, Agent, or Firm* — Venable LLP; Henry J. Daley

(57) ABSTRACT

Particles are separated, concentrated, or mixed within a fluid by means of a fluid-containing cell having a longitudinal axis, a cross-sectional area generally perpendicular to the longitudinal axis, and at least one particle motivating force directionally interacting with at least one recurrent circulating fluid flow generally aligned with the longitudinal axis within the fluid containing cell.

9 Claims, 9 Drawing Sheets

OTHER PUBLICATIONS

Ramos et al., "Pumping of liquids with ac voltages applied to asymmetric pairs of microelectrodes," Phys. Rev. E.: 67 (5) (2003) 056302-1-056302-11.
Bees et al., "Planktonic interactions and chaotic advection in Langmuir circulation," Mathematics in Computers in Simulation 44 (1998) 527-544.
Camassa et al., "Transport of a passive tracer in time-dependent Rayleight-Benard convection," Physica D 51 (1991) 472-481.
Katsura et al., "Direct laser trapping of single DNA molecules in the globular state," Nucleic Acids Research 26 (21) (1998 4943-4945.
Braun et al., "Trapping of DNA by thermophoretic depletion and convection," Phys. Rev. Lett: 89 (18) (2002) 188103-1-188103-4.
Zhang et al., "Titanium bulk micromachining for biomems applications: a DEP device as a demonstration," Proc. of IMECE: 2004 ASME Int'l. Mech. Eng. Congress & RD&D Expo: (2004) 1-4.
Pethig, R. et al., "Positive and negative dielectrophoretic collection of colloidal particles using interdigitated castellated microelectrodes," J. Phys. D: Appl. Phys., (1992), pp. 881-888, vol. 24(5).
Stommel, H., "Trajectories of small bodies sinking slowly through convection cells," J. Marine Research, (1949), pp. 24-29, vol. VIII(1).
Stommel, H., "Streaks on natural water surfaces," Weather, (1951), pp. 72-74, vol. 6(3), National Research Council Library.

* cited by examiner (a)

(b)

1.9 + 0.71 micron particles 0.71 micron particles

DYNAMIC EQUILIBRIUM SEPARATION, CONCENTRATION, AND MIXING APPARATUS AND METHODS

CROSS REFERENCE TO RELATED APPLICATIONS

This application claims the benefit under 35 U.S.C. § 119 (e) of co-pending and commonly-assigned U.S. Provisional Patent Application Ser. No. 60/737,989, entitled "DYNAMIC EQUILIBRIUM SEPARATION AND CONCENTRATION APPARATUS AND METHOD" by Igor Mezic, which application is incorporated by reference herein.

STATEMENT REGARDING FEDERALLY SPONSORED RESEARCH AND DEVELOPMENT

This invention was made with Government support under Grant No. 0086061 awarded by NFS/ITR. The Government has certain rights in this invention.

BACKGROUND OF THE INVENTION

1. Field of the Invention

The present invention is related generally to combined fluid flow and particle motivating force methods for particle manipulation, and is related specifically to dynamic equilibrium separation, concentration, dispersion and mixing apparatus and methods.

2. Description of the Related Art (Note: This application references a number of different publications as indicated throughout the specification by one or more reference numbers within brackets, e.g., [x]. A list of these different publications ordered according to these reference numbers can be found below in the section entitled "References." Each of these publications is incorporated by reference herein.)

Dielectric particles suspended in a dielectric media are polarized under the action of electric fields. If the field is spatially inhomogeneous, it exerts a net force on the polarized particle known as a dielectrophoretic (DEP) force [1]. This force depends upon the temporal frequency and spatial configuration of the field as well as on the dielectric properties of both the medium and the particles.

Dielectrophoresis is an increasingly popular method to separate particles in microflows [2]. DEP forces can be switched on and off to selectively capture cells, bacteria, spores, DNA, proteins, and other matter. The art has envisioned, for instance, an application using DEP to capture a suspected pathogen which then is shuttled to a selected area of the microfluidic device where its DNA is extracted and analyzed.

Since the dielectrophoretic mobility of a particle scales directly with its surface area the manipulation of smaller particles requires larger gradients of the electric fields. Nevertheless, by using microfabricated electrodes to generate large electric field gradients, it is known in the art to move submicron particles by means of DEP [3, 11].

However, large electric field gradients may strongly interact with the background media creating, by several electrohydrodynamic effects, flows whose drag perturbs the particle trajectories. An understanding of this disturbance remains crucial to predict and control it in developing applications of DEP to specific microfluidic devices. On the other hand, the combined dynamics induced by both advection and electric forces remains a largely unexplored but interesting field of research.

It can be seen, then that there is a need in the art for improved methods of and apparatuses for efficiently and accurately detecting, separating, mixing, and harvesting of small amounts of particles (e.g., atoms, molecules, cells in biological and chemical assays) using combined fluid flow and dielectrophoresis methods for particle manipulation. The present invention satisfies this need and that of a more general case when the particle motivating force is not dielectrophoretic in nature.

SUMMARY OF THE INVENTION

The present invention discloses methods of and apparatus for separating, concentrating, dispersing and mixing particles within a fluid.

The apparatus comprises a fluid-containing cell having a longitudinal axis, a cross-sectional area generally perpendicular to the longitudinal axis, and at least one particle motivating force directionally interacting with at least one recurrent circulating fluid flow, also referred to as a "through flow" generally aligned with the longitudinal axis within the fluid containing cell. The fluid containing cell cross-sectional area may be symmetrical or nonsymmetrical. Moreover, the fluid containing cell has at least one recurrent circulating fluid flow, preferably but not essentially, generally aligned with the longitudinal axis within the fluid containing cell. In addition, the fluid may be a liquid or a gas, and the particles may be charged or neutral.

In a broad aspect, the method of the present invention comprises the steps of forming at least one recurrent circulating fluid flow within a particle containing fluid to function as a through flow force on the particles, and directionally interacting at least one particle motivating force with the recurrent circulating fluid flow or through flow force on the particle. In this manner, utilizing modifications of the present inventions apparatus and methods discussed below, the present invention can be utilized to both separate and concentrate particles as well as to mix particles. Additionally, the method of the present invention can include the subsequent steps of detecting the particles, following application of the particle motivating force, and of collecting the particles, following their detection as well as the steps of advancing or collecting the mixed particles from a particle mixer of the present invention.

In one exemplary embodiment of the present invention, the particle motivating force directionally interacts with the recurrent circulating fluid flow in a tangential orientation relative to the recurrent circulating fluid flow. In another exemplary embodiment, the particle motivating force directionally interacts in a tangential orientation near the periphery of the recurrent circulating fluid flow. In yet another exemplary embodiment, the particle motivating force directionally interacts in a tangential orientation within the recurrent circulating fluid flow. In any of these exemplary embodiments, the particle motivating force may be an electrochemical, electromechanical or mechanical force with a single frequency or multiple frequency oscillatory components.

BRIEF DESCRIPTION OF THE DRAWINGS

Referring now to the drawings in which like reference numbers represent corresponding parts throughout.

1(*c*) is a graph that illustrates an electric field strength, $|E|^2$, in a plane 10 μm above the electrodes.

Figure 2:
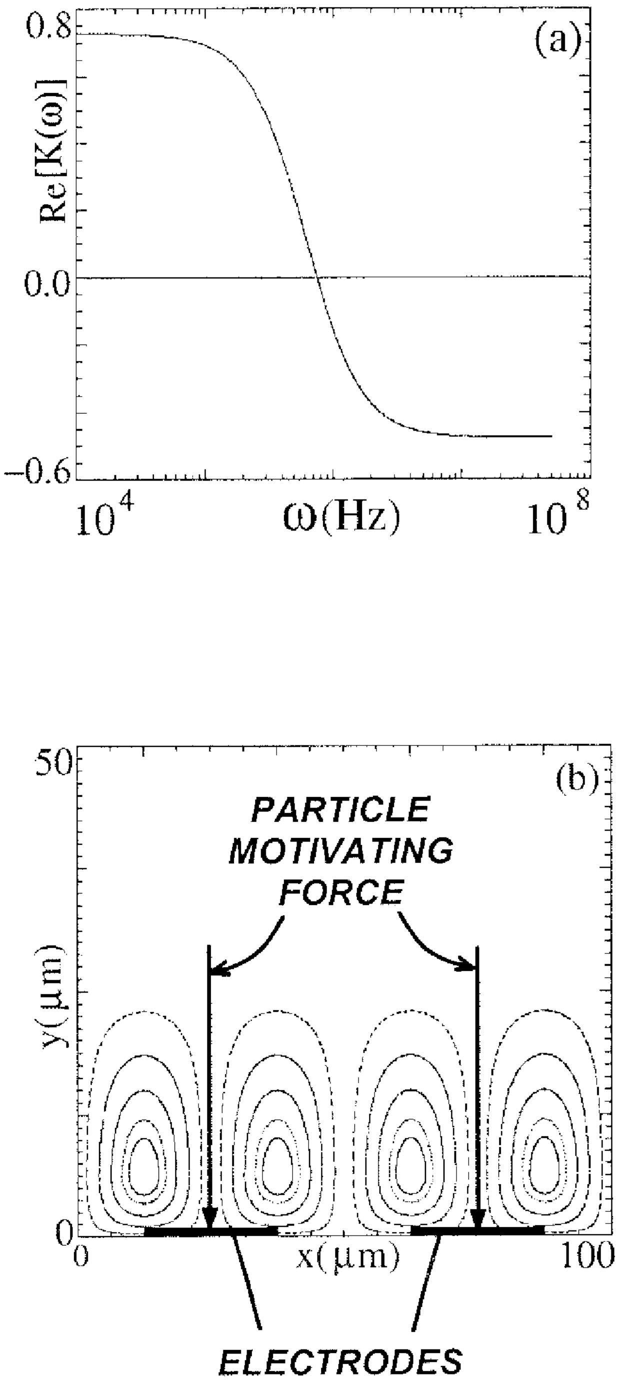

FIG. 2(*a*) is a graph that plots the real part of the Clausius-Mossotti function for $\epsilon_m=80\,\epsilon_0$, $\sigma_m=0.001\,S\cdot m^{-1}$, $\epsilon_p=2.5\,\epsilon_0$ and $\sigma_p=0.009\,S\cdot m^{-1}$, and FIG. 2(*b*) is a graph that illustrates streamlines of the cellular flow used in the model.

Figure 3:
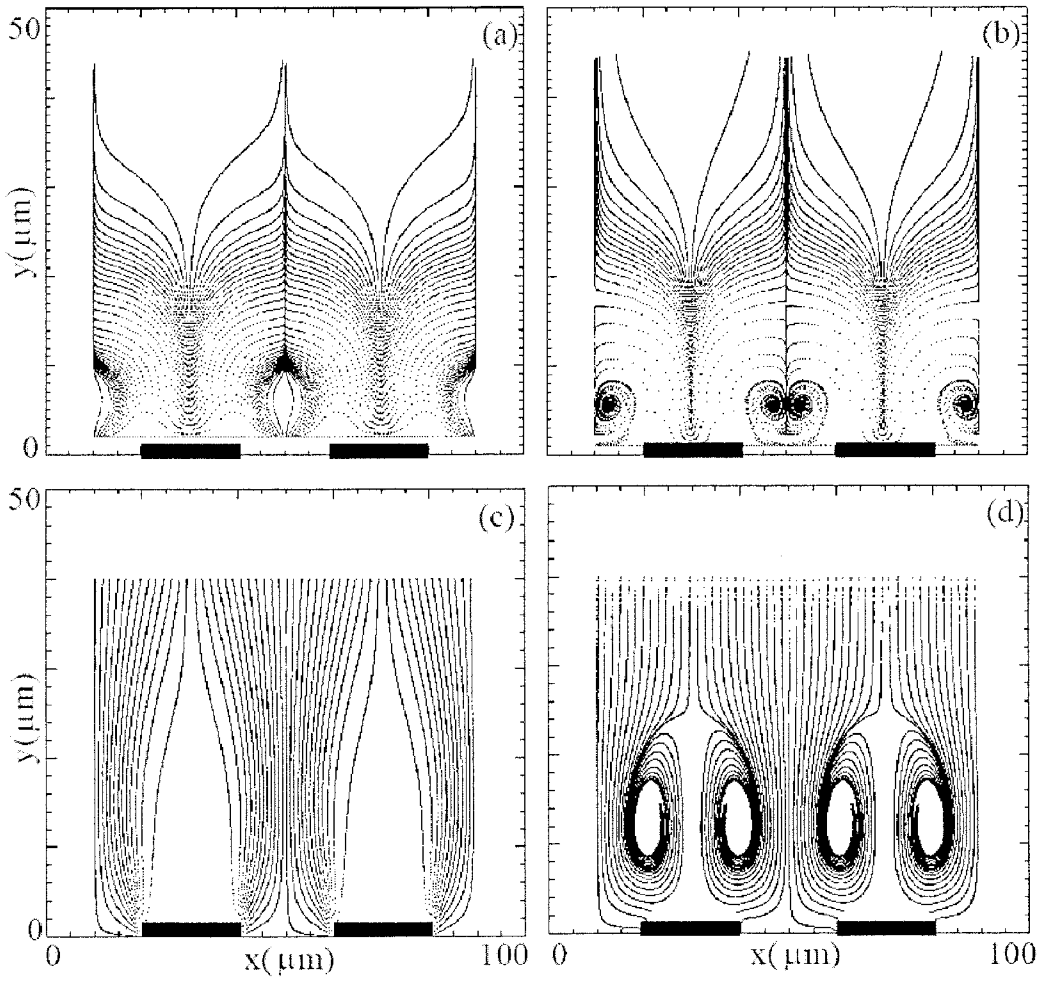
Figure 4:
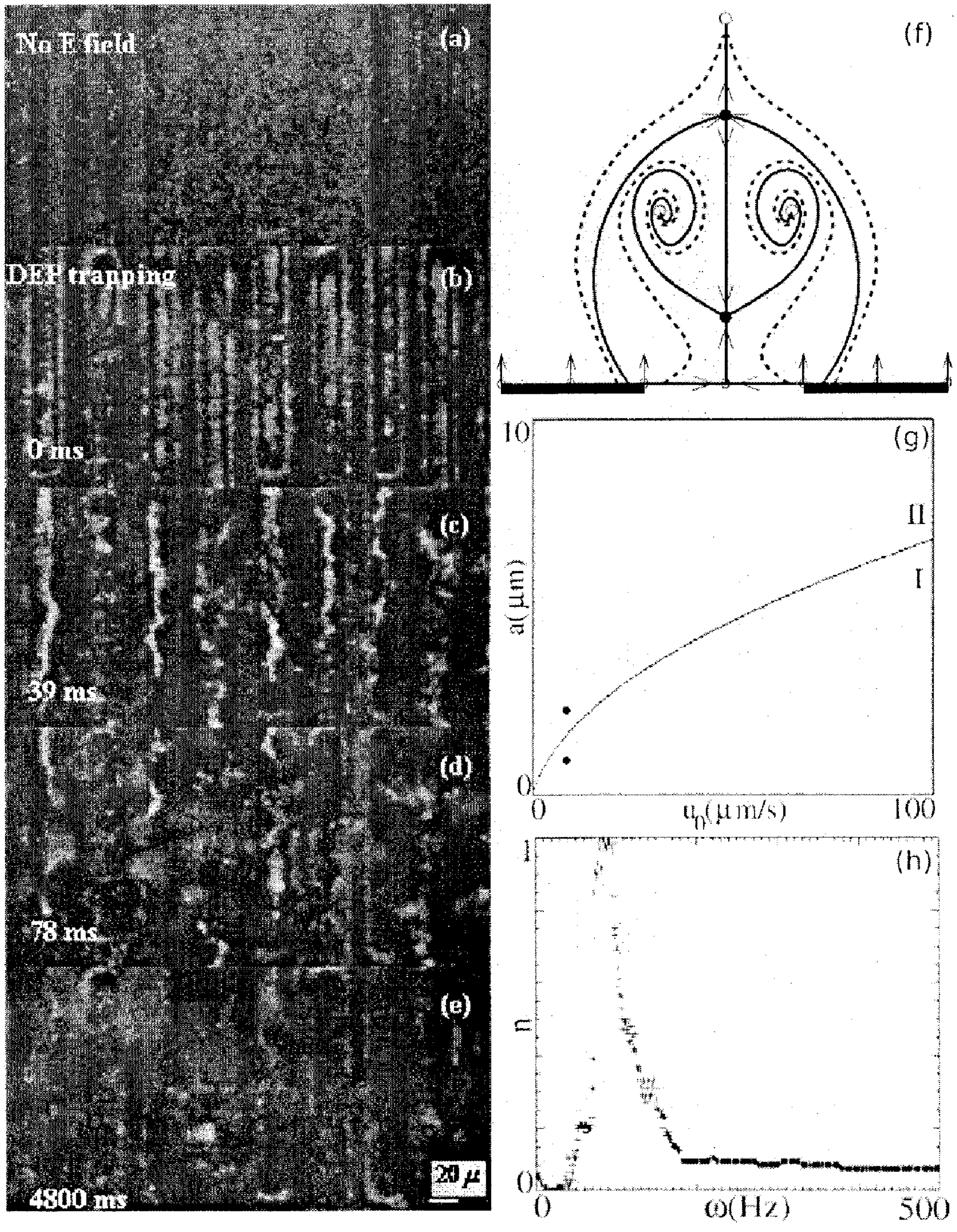

FIG. 3(*a*) is a graph that illustrates particle trajectories with n-DEP for point II in FIG. 4, corresponding to ω=5 MHz, $\rho_m/\rho_p=0.95$, β=0.15 d and a=1.5 μm, with a flow moving from the gap to the electrodes, FIG. 3(*b*) is a graph that illustrates, for point I in FIG. 4, a=0.75 μm, with the same flow as before. FIGS. 3(*c*) and 3(*d*) are graphs similar to FIGS. 3(*a*) and 3(*b*) for the same parameters with p-DEP, respectively.

FIG. 4(*a-e*) comprise an image sequence showing the DEP-electro-thermal-convective trapping of 1 micron diameter latex beads and the effect of a low frequency disturbance, wherein the potential is 10 Vpk-pk, the main frequency is 10 KHz and perturbing frequency is 100 Hz, and the focus is at 6 microns above the electrodes. The time-dependent disturbance is capable of dispersing particles and mixing them.

FIG. 4(*f*) is a phase portrait of the model, in arbitrary scales, showing the stable (white circles) and unstable (black circles) fixed points.

FIG. 4(*g*) is a graph comprising a bifurcation diagram in the parameter space (a, $u_0$, region I is where trapping occurs).

FIG. 4(*h*) is a graph of the ratio of dispersing particles initially within the trapping zone, escaped after 10 cycles, as a function of the frequency of perturbation, with $\epsilon=0.1$.

Figure 5:
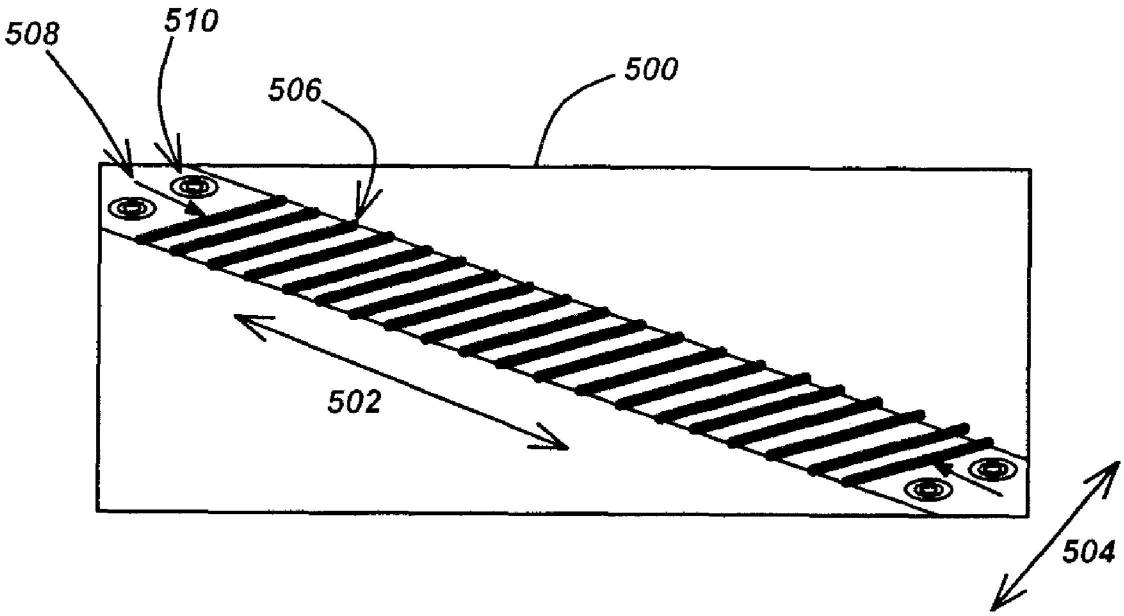

FIG. 5 illustrates an apparatus for separating and concentrating particles within a fluid, according to an exemplary embodiment of the present invention.

Figure 6:
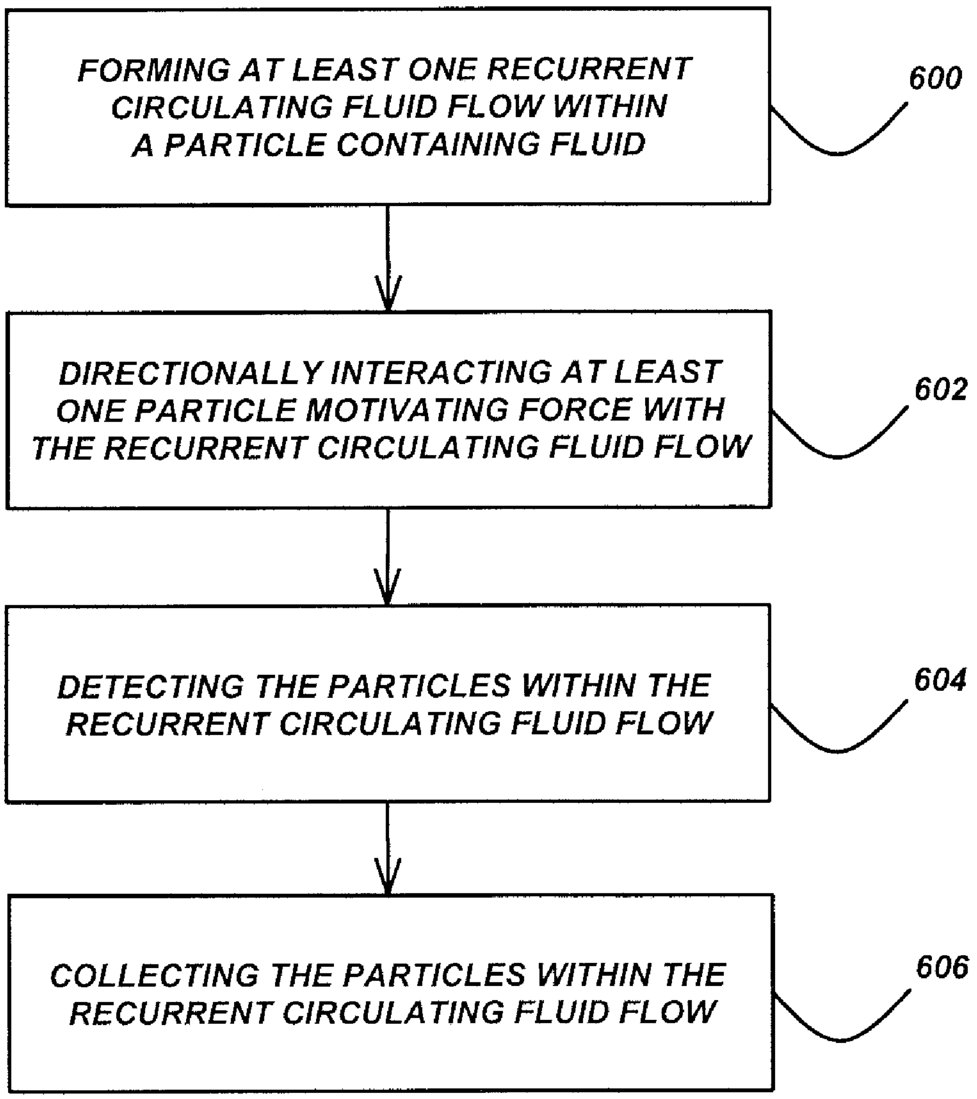

FIG. 6 illustrates a method of dynamically separating and concentrating particles within a fluid, according to an exemplary embodiment of the present invention.

Figure 7:
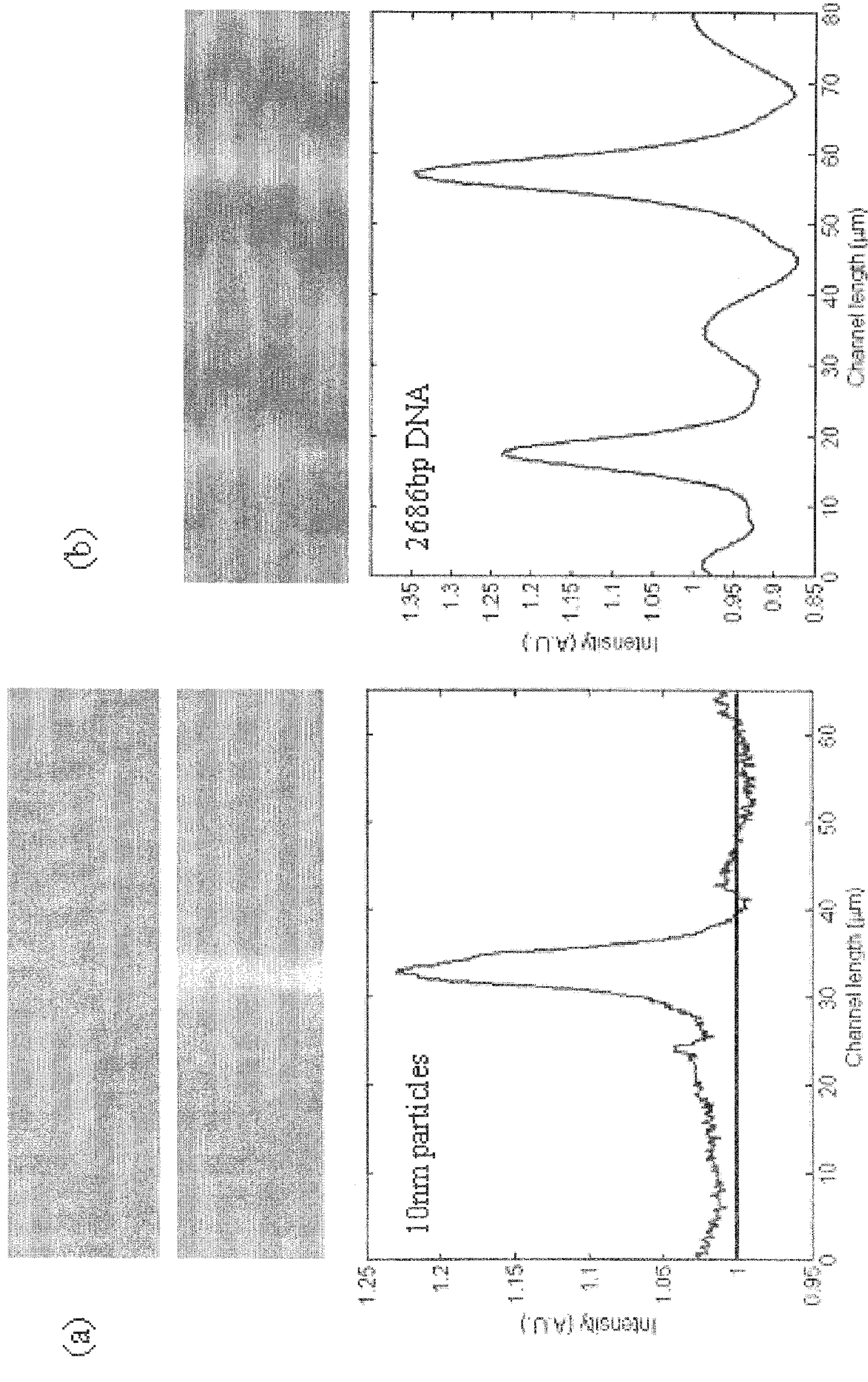

FIG. 7(*a, b*) is a set of graphs that illustrate a concentration profile of particle density versus location along the channel length of an exemplary apparatus of the present invention as illustrated in FIG. 5.

Figure 8:
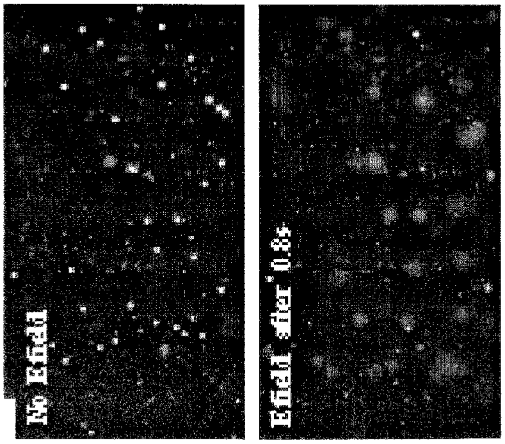

FIG. 8(*a, b*) is an image sequence that illustrates the ability of the present invention to manipulate particles suspended in a fluid to both separate and concentrate the particles. The top photo shows a mixture of particles having relative diameters of 1.9 and 0.71 microns and suspended within a cell of the present invention and the bottom photo shows the effects of the application of an exemplary multi-frequency particle motivating electric field to separate the chemically similar particles by size.

Figure 9:
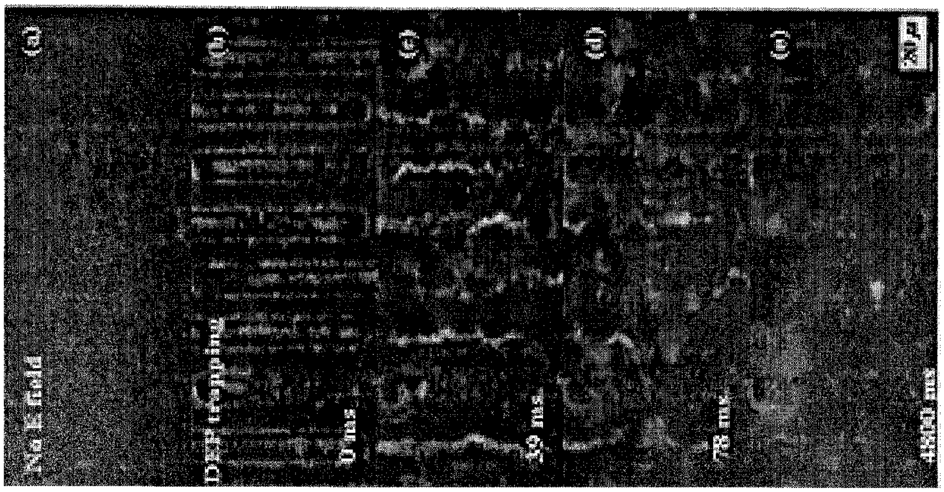

FIG. 9(*a-e*) is an image sequence showing an exemplary embodiment of the present invention operating in time sequence and demonstrating the ability of the present invention to both separate and concentrate 0.71 micron particles as well as the subsequent mixing of the particles in the same apparatus.

Figure 10:
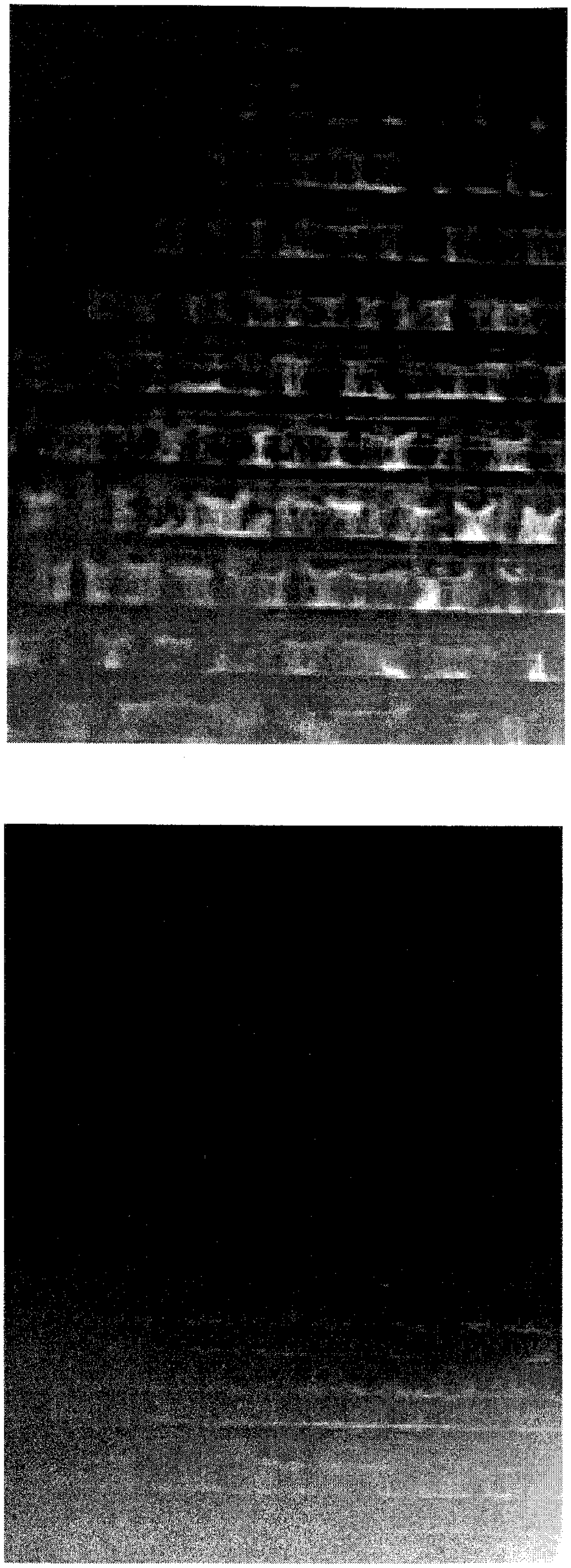

FIG. 10 is an image sequence showing the ability of the present invention to combine the dielectrophoretic force ($F_{tw}$) with an electrokinetic flow to accelerate the process of particle manipulation and transport within the exemplary cell.

DETAILED DESCRIPTION OF THE INVENTION

In the following description of the exemplary embodiments of the present invention, reference is made to the accompanying drawings that form a part hereof, and in which are shown by way of illustration the underlying principles of the present invention as well as specific embodiments in which the invention may be practiced. It is to be understood that other embodiments may be utilized and structural changes or modifications to the methods may be made without departing from the scope of the present invention.

Overview

In accordance with the teachings of the present invention, convective fluid motion induced by one or more particle motivating forces and the resultant dielectrophoretic manipulation of particles is disclosed herein in the exemplary context of electrical fields. For purposes of explanation, a simplified exemplary model, specifically, a microfluidic separation, concentration, or mixing apparatus comprises a channel with a periodic array of microelectrodes is shown first to illustrate the functional and physical aspects of the invention and then to illustrate the invention itself. Utilizing the teachings of the present invention this apparatus illustrates how the exemplary electro-convective flows of the present invention induce the formation of traps for particles, providing a novel and dynamic mechanism to control microparticles in such apparatus. An examplary use of the present invention is to separate and detect small populations of pre cancerous cells from body fluids (blood, sputum, urine) for high throughput screening during routine medical check-ups. In contrast, prior art methods require extensive human interaction and generally lack the required sensitivity to meet reliability testing standards. Another exemplary use is to detect small amounts of pathogens in water and air supplies. A further exemplary use of the present invention is the concentrating of DNA particles inside of a Polymerase Chain Reaction apparatus for improved DNA detection.

Technical Description

A further understanding of the present invention is provided by the use of an apparatus where the DEP particle dynamics produced by a microfluidic device, which in accordance with the teachings of the present invention, is formed to include a channel with a periodic array of microelectrodes arrays. Fluid flow in the channel is perturbed by advection due to the corresponding electro-hydrodynamic convective flow such that an important dynamic consequence of the perturbing flow results: namely, the appearance of zones within the fluid flow channel from where particles cannot escape. Those skilled in the art will appreciate that the trapping mechanism of the present invention can have both positive and negative consequences: while it spoils n-DEP transport, it improves p-DEP behavior by capturing particles away from the electrodes.

Figure 1:
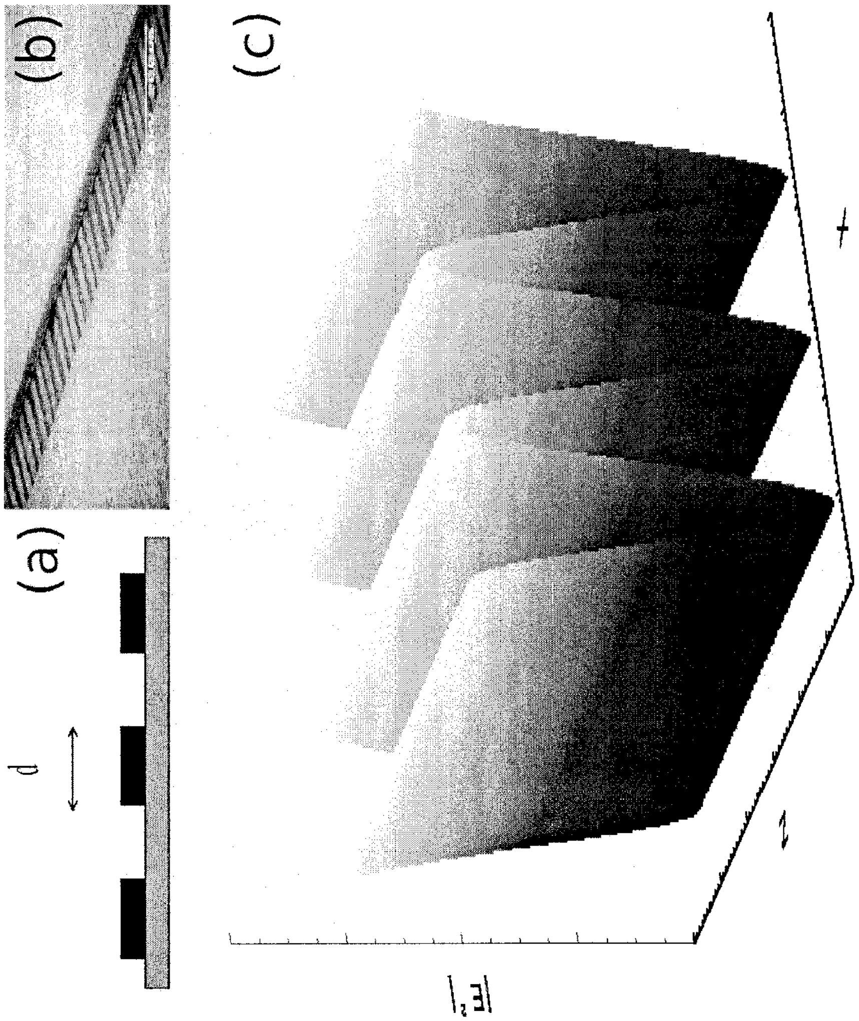
FIG. 1(*a*) is a block diagram that illustrates the arrangement of an interdigitated electrode array, FIG. 1(*b*) is a scanning electron microscope (SEM) image of a titanium dielectrophoretic (DEP) chip with 24 parallel electrodes, and FIG.

An exemplary embodiment of such a periodic array of microelectrodes is a simple configuration of electrodes for which a closed-form solution of the electric field and the DEP force can be derived as in [4]. This exemplary array is useful for illustrating the teachings of the present invention and is comprised of a periodic array of long parallel microelectrodes, as illustrated in FIG. 1(*a*). The time-averaged DEP force is:

$$\langle F_{DEP}\rangle = 2\pi a^3 \varepsilon_m \mathrm{Re}[K(\omega)]\nabla|E|^2 \qquad (1)$$

$$\nabla|E|^2 = \frac{\pi^3 V_0^2}{K^2(\cos(\pi/4))d^3}\square\mathrm{Re}\begin{bmatrix} izk(z)k'(z) \\ -zk(z)k'(z) \end{bmatrix}$$

$$k(z) = \left(\frac{z}{1-2z\cos(\pi/2)+z^2}\right)^{1/2}$$

$$z = \exp(\pi(ix-y)/d)$$

where E is the rms electric field, a is the particle radius, ω is the angular field frequency, and Re[z] indicates the real part of the complex number z. The factor K(ω) is a measure of the effective polarizability of the particle, known as the Clausius-Mossotti factor, given by $$K(\omega)=(\in^*_p-\in^*_m)/(\in^*_p+2\in^*_m)$$

where $\in^*_p$ and $\in^*_m$ are the complex permittivities of the particle and the medium, respectively.

The complex permittivity is defined as $\in^*=\in-i(\sigma/\omega)$, where $i=\sqrt{-1}$, $\in$ is the permittivity, and σ is the conductivity of the dielectric.

The Clausius-Mossotti factor depends on the dielectric properties of the particle and the medium, and on the frequency of the applied field. Variations in this factor give rise to a DEP force that is frequency dependent and unique to each particle type. For example, for a sphere, the real part of K(ω) is bounded by the limits $-\frac{1}{2}<\text{Re}[K(\omega)]<1$. When $\text{Re}[K(\omega)]>0$, the induced force points toward the high electric field at the electrode surfaces and is known as positive-DEP (p-DEP). In this case, the particles are collected at the electrode edges. Conversely, when $\text{Re}[K(\omega)]<0$ (a negative-DEP or n-DEP induced force), the force points in the direction of decreasing field strength and the particles are repelled from the electrodes edge as shown in FIG. 2(*a*).

In the exemplary configuration of the present invention described herein, the electric field has local minima (negative DEP traps) above the center of the electrodes, whereas it reaches the strongest values at the edges of the electrodes as shown in FIG. 1(*c*). In the absence of fluid flow, the particles experiencing p-DEP collect at the strong field points across the electrode array. On the other hand, particles pushed away from the electrodes by n-DEP reach an equilibrium position away from the electrodes where the vertical component of the DEP force is balanced by buoyancy. Since the horizontal component decays much faster than the vertical one, in dynamic terms these equilibrium positions form, in practice, a continuous line of fixed points.

However, Those skilled in the art will appreciate that electric fields induce fluid motions through several electro-hydrodynamic effects. The most important of those that occur in the microelectrode devices of the present invention are electrothermal convection and AC-electroosmosis. The former appears due to a non-uniform Joule heating of the fluid which leads to gradients of its permittivity and conductivity. The applied electric fields acting on the permittivity and conductivity gradients generate electrical body forces that induce the flow [5]. The latter, instead, is caused by electrical stresses in the diffuse double layer of charges accumulated above the electrodes [10]. These stresses result in a rapidly varying fluid velocity profile in the diffuse double layer, changing from zero at the wall of the fluid flow channel to a finite value just outside the double layer. Whether electrothermal or AC-electroosmotic flows dominate the motion of fluid in the inventive device depends mainly on the frequency of the applied electric field, AC-electroosmosis being dominant at a frequency range several orders of magnitude below the charge relaxation frequency ($\omega_c=\sigma/\in$).

In any of these situations, the electro-hydrodynamic forces dominate the buoyancy forces at typical microfluidic system sizes (d<300 μm) [6]. In accordance with the teachings of the present invention, with a careful choice of the applied frequency, the induced fluid flows will have a minimal effect. However, in the DEP manipulation and/or separation of submicron particles in the present invention one will usually use frequencies for which the fluid flow generated electro-hydrodynamically is taken into account. Utilizing the teachings of the present invention this is not necessarily a problem or annoyance, because the induced dynamic properties are used as a mechanism to control microparticles to induce separation, concentration, or mixing, as desired.

For example, experiments and numerical simulations of what the prior art considers to be coupled electro-thermo-hydrodynamic problems in prior art devices with interdigitated array of electrodes [8-12] have shown that both electrothermal and AC-electroosmotic flows consist of convective rolls centered at the electrode edges. These provide good estimates for their strength and frequency dependence. Near the electrodes, the fluid velocity $u_o$ ranges from 1 to 100 $\mu m \cdot s^{-1}$ decaying exponentially with the transversal distance to the electrodes. Additionally, the flow satisfies no-slip boundary condition at the bottom of the prior art device ($u_x=u_y=0$) and both the horizontal component of the velocity and the normal derivative of the vertical component vanish at the symmetry planes ($u_x=\partial u_y/\partial n=0$).

To further illustrate the positive results provided by the present invention and its unique ability to utilize what the prior art has considered to be a limiting problem, the impact on the DEP dynamics of observed cellular flow, was mimicked with an embodiment incorporating all of the above mentioned conditions. The resultant flow, depicted in FIG. 2(*b*), comes from the stream function:

$$\Phi_{steady}=u_0 \cdot y^2 e^{-y/\beta}\cos(\pi x) \tag{2}$$

which ensures its incompressibility, $\nabla \cdot u=0$. The parameters β controls the vertical position of the center of the rolls.

In an exemplary device having a characteristic longitudinal axis length d=20 μm, with flow velocities $u_0=10\ \mu m\ s^{-1}$, fluid viscosity $\nu=10^{-6}\ m^2\ s^{-1}$ ($\eta=\rho\nu=10^{-3}\ Kgm^{-1}\ s^{-1}$),, and micrometer particles a=1 μm, the particles' Stokes number is of order $St=(2a^2u/9\nu d)=10^{-6}$, which implies that inertial effects can be neglected. For particles of a few hundreds of nm, Brownian motion can also be neglected when compared to DEP forces [5]. Therefore, the velocity of the particles is determined by only the DEP, buoyancy and drag forces:

$$\frac{dr}{dt}=u+\frac{\langle F_{DEP}\rangle}{6\pi\eta\alpha}+(\rho_p-\rho_m)\cdot\frac{2a^2}{9\eta}\cdot g \tag{3}$$

In accordance with the teachings of the present invention, the relative importance of these three terms is controlled by three parameters: the applied voltage μ, the radius of the particle a, and the size of the electrode d. As those skilled in the art will appreciate, the influence of fluid flow gets progressively bigger as the size of the particles gets progressively smaller, and the buoyancy term only becomes important far from the electrodes where both the flow and DEP forces are negligible.

To further illustrate the present invention and its underlying features and abilities, the motion of the particles was analyzed further by using dynamic systems methods on a simple flow model. Two different dynamic phenomena were thus revealed. First, far from the electrodes, the flow is only a small perturbation of the quiescent state. Thus, the invariant line of fixed points that in the absence of flow is located where the n-DEP force balances the positive buoyancy, disintegrates into a discrete chain of interconnected saddles and nodes. Due to normal hyperbolicity [13], the invariant manifold originally formed by a continuum of fixed points is preserved with just a slight change of shape at the saddle-node connecting manifold.

This, however, induces a dramatic change in the dynamics of the particles because hyperbolic fixed points repel the particles which then accumulate in small regions near the nodes as illustrated in FIGS. 3(*a, b*). There the trajectories of several particles submitted to n-DEP forces are shown to convergence towards equilibrium points situated above the inter-electrode gaps. Analogously, FIGS. 3(*c, d*) show for p-DEP, that the particles, which in absence of flow should accumulate at the edges of the electrodes, can be forced by the flow to concentrate in the center of the electrodes instead.

Prior art experimental evidence confirming the accumulation of particles in small regions above the electrodes has been reported for both n-DEP [3, 7] and p-DEP [5, 14], but without reference to the dynamic origin of the phenomenon as taught by the present invention.

Secondly, a stronger dynamic effect takes place closer to the electrode surfaces: namely, the creation of a closed zone from which particles cannot escape. FIGS. 3(*b,d*) show two qualitatively different behaviors: some particles are trapped in closed areas above the gap between electrodes, whereas others escape from the flow influence and converge to fixed points determined only by the DEP force. These sets of trapped orbits resemble the Stommel retention zones [15, 16] studied in the context of sediments, plankton and nutrients dynamics in the ocean in the presence of the Langmuir circulation [17].

However, in contrast with this case, since the DEP force induces a non-volume-preserving dynamics, the motion within the trapping zone is "dissipative" in the dynamic systems sense. As a consequence, the particles here converge towards foci fixed points instead of circulating around centers as in the Stommel case. A phase portrait of Eq. (3) revealing this dynamic feature is shown FIG. 4(*f*).

It is noted that, while the DEP force scales with the volume of the particles, the Stokes force scales with their radius a. Therefore, the relative importance of these forces as described in Equation. (3) is proportional to $a^2$. Fixing the flow parameter $u_0$ and studying the dynamics as radius a varies, it appears that a Stommel-like zone exists only if a is smaller than a critical value $a_c$. The dependence of this value $a_c$ on flow strength is shown in FIG. 4(*g*). At $a_c$, bifurcations involving the collision and mutual annihilation of the two foci and the two saddles occur leading to the disappearance of the trapping zones. The right hand side panels in FIG. 3 show trapping zones for both n-DEP (top) and p-DEP (bottom) with $a_c<a$ whereas the left hand side panels show no signs of the former traps for $a_c>a$.

Thus, in accordance with the teachings of the present invention it is now shown that these dynamics can be used to govern the behavior of the trapping zones within the apparatus of the present invention utilizing the methods of the present invention. In contrast to the prior art problem of the break up of transport barriers in volume preserving steady flows [19], with the present invention it now is possible to utilize these small time-dependent perturbations to break the trapping zones and mix or disperse particles.

To introduce a time-dependent perturbation of the flow generated in the microelectrode apparatus of the present invention a small low frequency electric field is added to the field used for the DEP manipulation. Thus, the electro-hydrodynamic force, and therefore the resulting flow, is composed of a steady term plus an oscillatory one of twice the frequency of the applied field. At sufficiently high frequencies, the oscillatory terms are comparatively small so that only the time-averaged flow need be considered. However, if a small low frequency component is added to the applied field, it eventually will reflect as time dependence in the convective flow and the DEP force. By modeling such perturbations with a time-dependent term to the stream function:

$$\phi=\phi_{steady}+\in\cdot u_0\cdot y^2 e^{-y/\beta}\sin(\pi x)\cdot\sin(2\omega t) \quad (4)$$

the Stommel regions will eventually break up providing complete DEP control.

In FIG. 4(*h*), the fraction of particles that escape from the trapping zone at a given time is plotted as a function of the frequency of the perturbation and illustrates, in accordance with the teachings of the present invention, that there is value of the frequency that optimizes the spread of the particles. This frequency is on the order of the characteristic turnover frequency of the flow $\omega_0$ u/d=10-100 Hz. This suggests the existence of some sort of resonant driven speed-up of the spreading of particles outside the trapping zone.

In order to confirm these dynamicaspects of the present invention, further experiments were conducted on the titanium based DEP device shown in FIG. 1(*b*) and described in [23]. An array of 20 micron titanium electrodes with a pitch of 40 microns was patterned on a titanium substrate covered with an isolation layer. A 0.2×6 mm channel was formed by through-etching a thin titanium foil 25 microns thick. Utilizing a syringe pump (Harvard Apparatus 2000), the channel was filled with a $7.2\cdot10^9$ particles/$mm^3$ solution of fluorescent polystyrene spheres (Duke Scientific, 1.05 g/$cm^3$ density and 1 micron nominal diameter) in dionized water (2 μS/cm) having a overall conductivity of 13 μS/cm. Once the flow was stabilized, an AC electric field provided by a function generator (Wavetek 21, 11 MHz range) was applied to the electrodes through a circuit to add the perturbation. The data was collected with an epifluorescent microscope (Nikon Eclipse), a 20× water immersion lens and a CCD camera (Hamamatsu C7300-10-12NRP).

FIG. 4(*a*) shows the stabilized particle containing fluid flow without the influence of an electrical field. The particles are uniformly suspended in the fluid. When the AC electric field (10 KHz, 9 Vp-p) was applied (see FIG. 4(*b*)), the particles moved toward the electrodes, accumulatingat the electrodes edges and above the electrode centers. Then, a 100 Hz, 9 Vp-p Ac signal was added and, in few milliseconds (see FIG. 4(*c-d*)), the trapping zone became unstable and the particles were dispersed in the fluid. FIG. 4(*e*) illustrates the continuous development of the perturbation.

In summary, in accordance with the teachings of the present invention this model and experiment of DEP in the presence of electro-hydrodynamic convection verified the presence of dynamic trapping regions. These dynamic trapping regions were analogous to the Stommel zones found in sedimentation in convective flows, but showed a different structure due to the non-Hamiltonian features of the DEP dynamics. Further, it was shown that small time-periodic perturbations allowed the particles to escape the traps as in the Hamiltonian case, causing mixing and dispersion of particles. Thus, in accordance with the teachings of the present invention, superimposing a low frequency electric field provides a simple and effective control tool for DEP manipulation of particles within a fluid.

As those skilled in the art will appreciate, the p-DEP traps of the present invention provide an efficient particle control and manipulation mechanism comparable to other proposed-mechanisms for manipulating particles such as optical tweezers [21] and thermophoresis [22]. Further, the present invention opens the door to more sophisticated combinations of DEP and hydrodynamic forces for control of bioparticles to provide effective separation, concentration, or mixing of particles in a fluid.

Exemplary Embodiments

The following describes exemplary embodiments of the present invention, including both exemplary apparatus and associated methods. In these embodiments, it should be understood that the fluid may be a liquid or a gas, and the particles may be charged or neutral.

FIG. 5 illustrates an apparatus for separating, concentrating, or mixing particles within a fluid, according to an exemplary embodiment of the present invention.

The apparatus comprises a fluid-containing cell 500 having a longitudinal axis 502, a cross-sectional area 504 generally perpendicular to the longitudinal axis 502, and at least one electrode 506 generating at least one particle motivating force 508 directionally interacting with at least one recurrent circulating fluid flow 510 generally aligned with the longitudinal axis 502 within the fluid containing cell 500. The fluid containing cell 500 cross-sectional area may be symmetrical or nonsymmetrical. Moreover, the fluid containing cell 500 has a plurality of recurrent circulating fluid flows 510 generally aligned with the longitudinal axis 502 within the fluid containing cell 500.

In one embodiment, the particle motivating force 508 directionally interacts with the recurrent circulating fluid flow 510 in a tangential orientation relative to the recurrent circulating fluid flow 510. In another embodiment, the particle motivating force 508 directionally interacts in a tangential orientation near the periphery of the recurrent circulating fluid flow 510. In yet another embodiment, the particle motivating force 508 directionally interacts in a tangential orientation within the recurrent circulating fluid flow 510. The particle motivating force 508 may be aligned in a wide variety of tangential orientations to modify or even to oppose the recurrent circulating fluid flow. Further, the at least one particle motivating force 508 may be a time dependent, multiple frequency force. In any of these embodiments, the particle motivating force 508 may an electrochemical, electromechanical or mechanical force.

Additionally, the particle motivating force 508 may be a plurality of particle motivating forces that may be aligned to complement or oppose each other to varying degrees. These multiple particle motivating forces may be of multiple frequencies and the individual frequencies may be variable in a time dependent manner.

FIG. 6 illustrates a method of dynamically separating and concentrating particles within a fluid, according to an exemplary embodiment of the present invention.

Block 600 represents the step of forming at least one recurrent circulating fluid flow within a particle containing fluid.

Block 602 represents the step of directionally interacting at least one particle motivating force with the recurrent circulating fluid flow. In one embodiment, the particle motivating force directionally interacts in a tangential orientation near the periphery of the recurrent circulating fluid flow. In another embodiment, the particle motivating force directionally interacts in a tangential orientation within the recurrent circulating fluid flow. In yet another embodiment, the particle motivating force directionally interacts with the recurrent circulating fluid flow in a tangential orientation relative to the recurrent circulating fluid flow to oppose the fluid flow.

Block 604 represents the step of detecting the particles, following application of the particle motivating force in Block 602.

Block 606 represents the step of collecting the particles, following their detection in Block 604.

It should be emphasized to those skilled in the art that with minor modification of the particle motivating force as discussed above, it is possible to use the apparatus and methods of the present invention to mix or disperse particles within the fluid. Once mixed, the particle containing fluid can be harvested or directed to further steps such as into a reaction chamber (not shown) for further processing.

As noted above, the concentration efficiency of the apparatus and methods of the present invention depends on the suspension conductivity and particle diameter. Utilizing the teachings of the present invention this efficiency has been confirmed with particles measuring from 10 nm to 690 nm in diameter. Further, the operability of the present invention to separate, concentrate, or mix particles has been confirmed with both charged and non-charged particles such as DNA and with suspension conductivity from 13 μS/cm to 10 mS/cm. In addition to concentrating and purifying particles by attracting them to specific regions within the exemplary apparatus, the present invention also is able to separate particles, including those with close physical properties. For example, particles having the same chemical properties but different diameters such as 1.9 and 0.71 micron can be separated, concentrated, or mixed with the present invention. Following the conception and reduction to practice of the present invention these capabilities were verified by theory.

For example, FIGS. 7(*a, b*) illustrate an exemplary concentration profile of particle density versus location along the channel length of an exemplary apparatus of the present invention as illustrated in FIG. 5. FIG. 7*a* illustrates the particle concentration profile for 10 nm particles both before the method of the present invention is initiated by applying the particle motivating force to the fluid in the channel of the apparatus and after the particle motivating force is applied. FIG. 7*b* illustrates.

In FIG. 7*a* the relatively flat, bottom curve illustrates the initial homogenous concentration of the exemplary 10 nm particles before the apparatus was turned on. The elevated, variable curve shows the particle concentration profile after turning on the exemplary apparatus of the present invention. It took less then half a second to reach the maximum concentration of this exemplary embodiment shown. The concentration region shown reaches 23%.

In FIG. 7*b*, the particle density profile for 2686 bp DNA is shown after the apparatus has been turned on in accordance with the teachings of the present invention. There, two concentration regions are shown demonstrating about a 30% improvement in concentration over a homogeneous solution.

FIG. 8(*a, b*) illustrate the ability of the present invention to manipulate particles suspended in a fluid to both separate and concentrate the particles. In FIG. 8*a* the top image shows a mixture of particles having relative diameters of 1.9 and 0.71 microns and suspended within a cell of the present invention. Though differing in diameter by a factor of two or more, the particles have the same chemical properties. In FIG. 8*b* the bottom image shows, after a multi-frequency particle motivating electric field was turned on in accordance with the teachings of the present invention, that the smaller 0.71 micron particles where attracted toward the bottom of the cell (the focal plane) while the bigger 1.9 micron particles were pushed to the top of the cell, effectively separating and concentrating the particles away from one another.

In FIG. 9(*a-e*) an exemplary embodiment of the present invention is shown in a time sequence of images to demonstrate both particle separation and concentration of 0.71 micron particles as well as the subsequent mixing of the particles in the same apparatus. These different functions are achieved in accordance with the teachings of the present invention by varying the particle motivating forces and illustrate the broad utility of the present invention.

It should also be appreciated by those skilled in the art that the methods and apparatus of the present invention are able to manipulate particles to achieve many different kinds of particle movement including the simple transport of particulate materials in suspension. For example, using an array of four consecutive electrodes in the cell of the present invention it is possible to independently control the electrodes to enable the use of traveling wave dielectrophoretic force ($F_{tw}$) to move particles from one position to another within the cell.

For example, the sequential images of FIG. 10 demonstrate that with the teachings of the present invention it is possible to combine the $F_{tw}$ with an electrokinetic flow such as electroosmosis or an electrothermal effect to accelerate the process of particle transport within the cell. The left hand photo of FIG. 10 demonstrates that the suspended particles move and concentrate from roll to roll due to the controlled interaction of $F_{TW}$ and an electroosmotic flow. The propagation velocity of the particles in this exemplary embodiment is 320 microns/s.

References

The following references are incorporated by reference herein:

[1] H. A. Pohl, Dielectrophoresis (Cambridge University Press, 1978).

[2] M. P. Hughes, Nanotechnology 11, 124 (2000).

[3] T. Muller, A. Gerardino, T. Schnelle, S. G. Shirley, F. Bordoni, G. De Gasperis, R. Leoni, G. Fuhr, J. Phys. D 29, 340 (1996).

[4] D. E. Chang, S. Loire, I. Mezi'c, J. Phys. D: Appl. Phys. 36, 3073(2003).

[5] A. Ramos, H. Morgan, N. G. Green, A. Castellanos, J. Phys. D: Appl. Phys. 31, 2338 (1998).

[6] A. Castellanos, A. Ramos, A. Gonzalez, N. G. Green, H. Morgan, J. Phys. D: Appl. Phys. 36, 2584 (2003).

[7] N. G. Green, A. Ramos, H. Morgan, J. Phys. D 33, 632 (2000).

[8] N. G. Green, A. Ramos, A. Gonzalez, A. Castellanos, H. Morgan, J. Electrostatics 53, 71 (2001).

[9] N. G. Green, H. Morgan, J. Phys. D 31, L25 (1998).

[10] N. G. Green, A. Ramos, A. Gonzalez, H. Morgan, A. Castellanos, Phys. Rev. E 61, 4011 (2000).

[11] N. G. Green, A. Ramos, A. Gonzalez, H. Morgan, A. Castellanos, Phys. Rev. E 66, 026305 (2002).

[12] A. Ramos, A. Gonzalez, A. Castellanos, N. G. Green, H. Morgan, Phys. Rev. E 67, 056302 (2003).

[13] S. Wiggins, Normally hyperbolic invariant manifolds in dynamical systems (Springer-Verlag, 1994).

[14] R. Pethig, Y. Huang, X. B. Wang, J. P. H Burt, J. Phys. D 24, 881 (1992).

[15] H. Stommel, J. of Marine Research 8, 24-29 (1949).

[16] H. Stommel, Weather, 72-74 (1951).

[17] M. A. Bees, I. Mezi'c and J. McGlade, Mathematics and Computer in Simulation 44, 527-544 (1998).

[18] L. D. Landau and E. M. Lifshitz, Fluid Mechanics (Pergamon, Oxford, 1959).

[19] J. M. Ottino, The Kinematics of Mixing: Stretching, Chaos, and Transport (Cambridge University Press, 1989).

[20] R. Camassa and S. Wiggins, Physical Review A 43, 774-797 (1991).

[21] S. Katsura, K. Hirano, Y. Matsuzawa, K. Yoshikawa and A. Mizuno, Nucleic Acids Res. 26, 4943 (1998).

[22] D. Braun and A. Libchaber, Phys. Rev. Lett. 89, 188103 (2002).

[23] Y. T. Zhang, E. R. Parker, M. F. Aimi, I. Mezic, and N. C. MacDonald, Proceedings of the 2004 ASME Congress.

Conclusion

This concludes the description of the preferred embodiment of the present invention. The foregoing description of one or more embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method for mixing and dispersing particles by applying a time-dependent electrohydrodynamic fluid flow together with at least one particle motivating force in an apparatus for separating and concentrating particles within a fluid in which the apparatus comprises a fluidic cell designed to contain fluids, the fluidic cell having a longitudinal axis and a cross-sectional area generally perpendicular to said longitudinal axis, said method comprising exposing the fluidic cell to at least one particle motivating force directionally interacting with the fluidic cell such that the at least one particle motivating force affects at least one recurrent circulating fluid flow generally aligned with said longitudinal axis within said fluidic cell resulting in at least one region of concentrated particles, wherein said at least one recurrent circulating fluid flow is confined within said fluidic cell.

2. A method for dynamically separating and concentrating particles within a fluid, comprising:

forming at least one recurrent circulating fluid flow within a particle-containing fluid; and, directionally interacting at least one particle motivating force with the at least one recurrent circulating fluid flow resulting in at least one region of concentrated particles, wherein said at least one recurrent circulating fluid flow is confined within a fluidic cell.

3. The method of claim 2, wherein the at least one particle motivating force directionally interacts with the at least one recurrent circulating fluid flow in a tangential orientation relative to the recurrent circulating fluid flow.

4. The method of claim 3, wherein the at least one particle motivating force directionally interacts in a tangential orientation near a periphery of the at least one recurrent circulating fluid flow.

5. The method of claim 3, wherein the at least one particle motivating force directionally interacts in a tangential orientation within the at least one recurrent circulating fluid flow.

6. The method of claim 2, further comprising detecting said particles.

7. The method of claim 2, further comprising collecting said particles.

8. The method of claim 1, wherein the at least one particle motivation force is time dependent.

9. The method of claim 8, further comprising directionally interacting at least a second time dependent particle motivating force with the at least one recurrent circulating fluid flow.

* * * * *